(12) United States Patent
Shimomura (10) Patent No.: US 6,467,225 B1
(45) Date of Patent: Oct. 22, 2002

(54) GLASS SHEET AND GLASS WINDOW FOR VEHICLES

(75) Inventor: Takahiro Shimomura, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/806,813

(22) PCT Filed: Oct. 4, 1999

(86) PCT No.: PCT/JP99/05480

§ 371 (c)(1),
(2), (4) Date: Apr. 4, 2001

(87) PCT Pub. No.: WO00/20241

PCT Pub. Date: Apr. 13, 2000

(30) Foreign Application Priority Data

Oct. 5, 1998 (JP) ............................................ 10-282157

(51) Int. Cl.[7] .................................................. E06B 3/00
(52) U.S. Cl. ...................... 52/204.5; 52/204.53; 52/208; 296/96.21; 296/146.15; 296/216.09
(58) Field of Search ............................ 52/204.53, 208, 52/204.5; 49/374; 296/146.15, 96.21, 216.09

(56) References Cited

U.S. PATENT DOCUMENTS 3,914,000 A * 10/1975 Beckerman et al. .......... 445/25
4,621,453 A * 11/1986 Watanabe
4,680,206 A * 7/1987 Yoxon
4,969,681 A * 11/1990 Schleicher et al. .... 296/216.08
5,027,567 A * 7/1991 Roberts
5,085,021 A * 2/1992 Kunert
5,138,804 A * 8/1992 Roberts
5,235,239 A * 8/1993 Jacob et al. ................. 313/230
5,540,514 A * 7/1996 Demars
5,570,923 A * 11/1996 Taylor
5,741,043 A * 4/1998 Palajac
5,778,599 A 7/1998 Saito
6,138,434 A * 10/2000 Demars et al. ................ 428/34

FOREIGN PATENT DOCUMENTS

| CH | 623 449 G | * | 6/1981 |
| DE | 296 21 302 | | 12/1996 |
| EP | 0 208 237 | | 7/1986 |
| EP | 0 801 201 | * | 3/1997 |
| FR | 2 658 237 | * | 2/1990 |
| JP | 63-82814 | | 4/1988 |
| JP | 3-98115 | | 1/1990 |
| JP | 7-137535 | | 5/1995 |

* cited by examiner

Primary Examiner—Carl D. Friedman
Assistant Examiner—Kevin McDermott
(74) Attorney, Agent, or Firm—Merchant & Gould P.C.

(57) ABSTRACT

The present invention provides a glass sheet having a hole for attachment of the sheet to a vehicle body. The hole includes a through hole and a thin part in contact with the through hole. A bolt is fitted so that the head of the bolt is fitted in the thin part.

9 Claims, 13 Drawing Sheets

GLASS SHEET AND GLASS WINDOW FOR VEHICLES

FIELD OF THE INVENTION

The present invention relates to a glass sheet and a glass window used in vehicles such as automobiles.

BACKGROUND OF THE INVENTION

Figure 12:
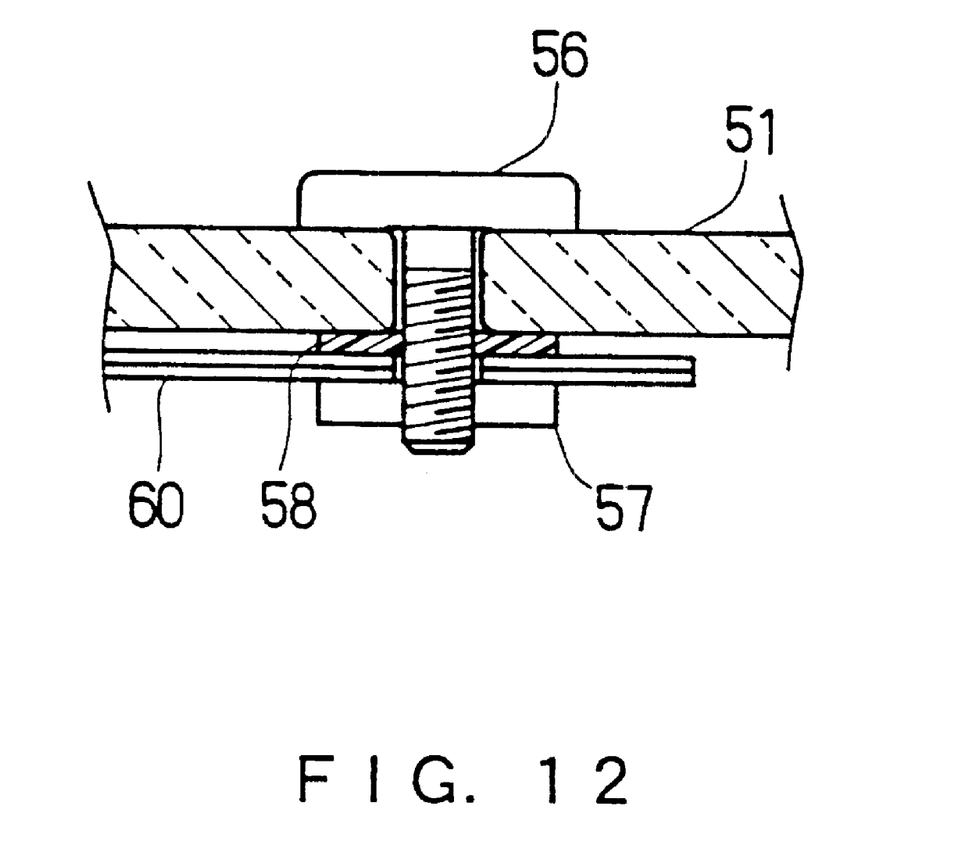
FIG. 12 is a partial cross-sectional view of a conventional glass window for vehicles.

In a glass window for vehicles such as automobiles, a glass sheet is usually fixed to a window frame by the edge thereof being supported by a molding. Alternatively, as shown in FIG. 12, a glass sheet 51 may be fixed to a vehicle body 60 by inserting a bolt 56 into a hole penetrating a glass sheet 51, and fixing the glass sheet 51 to the vehicle body 60 via a cushion 58 with the bolt 56 and a nut 57. Although forming a hole in the glass sheet is required, there is no need to prepare a window frame to which the glass sheet is fixed in this glass window. Therefore, such a window is more advantageous because of a higher degree of flexibility in the design of the vehicle body.

Figure 13:
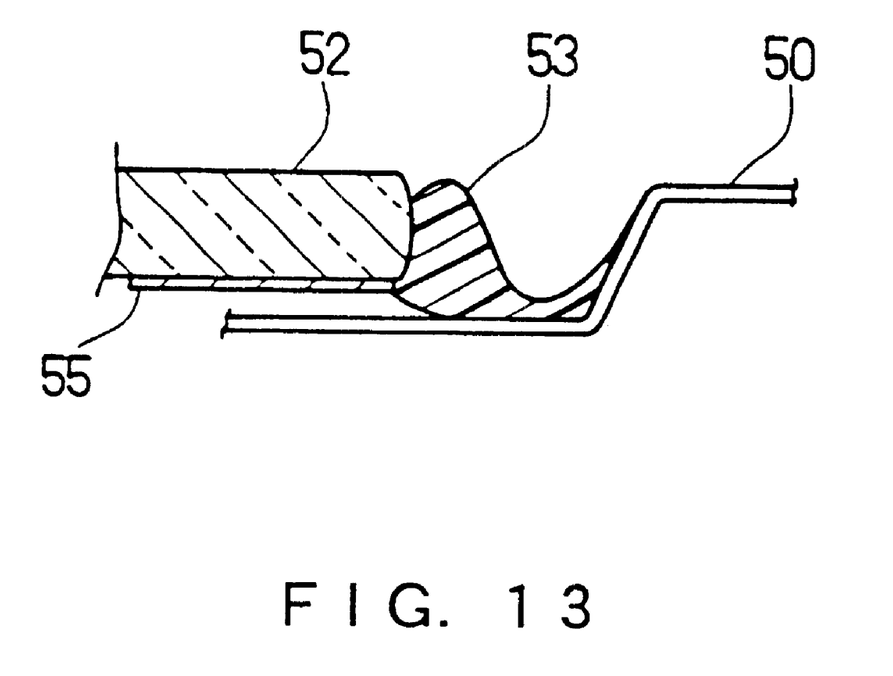
FIG. 13 is a partial cross-sectional view of a conventional glass window for vehicles having a flush surface.

On the other hand, in the field of vehicles, especially, automobiles, an attempt to provide a vehicle body with a flush surface has been made in order to reduce air resistance and eliminate wind noise. As shown in FIG. 13, a glass window having a glass sheet 52 and a supporting member flush with a vehicle body 50 has been proposed. In the glass window, a resin 53 is extruded directly at an edge of the glass sheet 52. As shown in FIG. 13, a ceramic mask 55 often is formed on the glass sheet 52 in order to prevent the attached portion from being seen from the outside.

However, no effective method for a flush surface has been proposed for a glass window in which a glass sheet is fixed to a vehicle body by utilizing a hole. The head of a bolt for fixing a glass sheet entirely protrudes from the surface of the glass sheet when the glass window is used.

On the other hand, in a resin window using a resin sheet, methods for a flush surface other than that shown in FIG. 13 have been proposed (e.g., Japanese Laid-Open Patent Publication (Tokkai-Sho) No.63-82814, Japanese Utility Model Publication No.3-98115, and Japanese Laid-Open Patent Publication (Tokkai-Hei) No.7-137535). However, a resin sheet is inherently different from a glass sheet, which is a brittle material. Unlike the glass sheet, the surface of a resin sheet is susceptible to scars. In the resin sheet, the problem of surface hardness is more significant than the problem of strength. Therefore, when considering the glass window for vehicles, in general, those skilled in the art have not referred to the resin window for vehicles produced with a resin sheet.

SUMMARY OF THE INVENTION

The present invention has an object of providing a glass window for vehicles in which a glass sheet is fixed to a body of a vehicle by utilizing a hole that has a reduced protrusion of a supporting member, such as a bolt, from the surface of the g lass sheet. The present invention has another object of providing a glass sheet suitable for such a glass window for vehicles. In order to achieve the object of the present invention, a glass sheet of the present invention includes a hole formed in the glass sheet for attachment of the glass sheet to a body of a vehicle. The hole includes a through hole and a thin part where a thickness of the glass sheet is reduced. The thin part is formed in contact with the through hole.

Such a glass sheet constitutes a glass window for vehicles in which a protrusion of a supporting member from the surface of the glass sheet can be reduced by utilizing the thin part of the glass sheet. More specifically, for example, when a glass sheet is fixed with a bolt, the head of the bolt is fitted in the thin part of the glass sheet, so that the protrusion of the head of the bolt can be reduced. The glass sheet can constitute a glass window in which the protrusion of the supporting member is eliminated so that the supporting member is substantially flush with the glass. sheet.

In one embodiment of the glass sheet of the present invention, the shortest distance between a periphery of the hole in the glass sheet and an edge of the glass sheet is preferably at least twice the thickness of the glass sheet. According to this preferred embodiment, the degradation of the strength of the glass sheet due to forming the hole can be suppressed.

Furthermore, in one embodiment of the glass sheet of the present invention, the glass sheet is preferably a tempered glass sheet. A difference between a thickness of the glass sheet and a thickness of the thin part is preferably 0.5 mm or more. The thickness of the thin part is preferably larger than a half of the thickness of the glass sheet. This preferred embodiment provides a glass sheet that is suitable to allow a glass window for vehicles to have a flush surface and is ensured the strength necessary as a window frame.

Furthermore, in another embodiment of the glass sheet of the present invention, the periphery of the hole preferably does not form an exact circle. According to this preferred embodiment, it is possible to constitute a glass window for vehicles useful in the prevention of stealing goods in the vehicle.

Furthermore, in order to achieve the above-described object, a glass window for vehicles of the present invention comprises the glass sheet of the present invention and a supporting member fitted in the hole for supporting the glass sheet.

Such a glass window for vehicles makes it possible to suppress the protrusion of the supporting member from the surface of the glass sheet and allow a flush surface of the glass window for vehicles with the glass sheet fixed by utilizing the hole.

DETAILED DESCRIPTION OF THE INVENTION

Hereinafter, the present invention will be described by way of examples with reference to the accompanying drawings.

Figure 1:
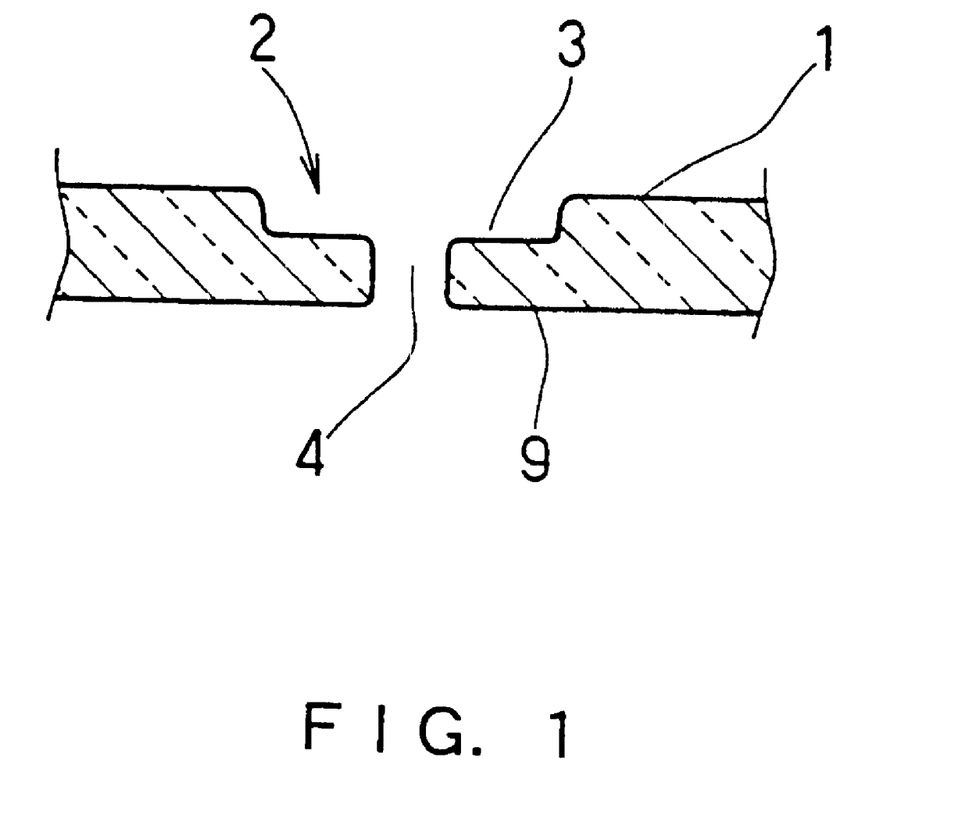
FIG. 1 is a partial cross-sectional view of an embodiment of a glass sheet of the present invention.
Figure 2:
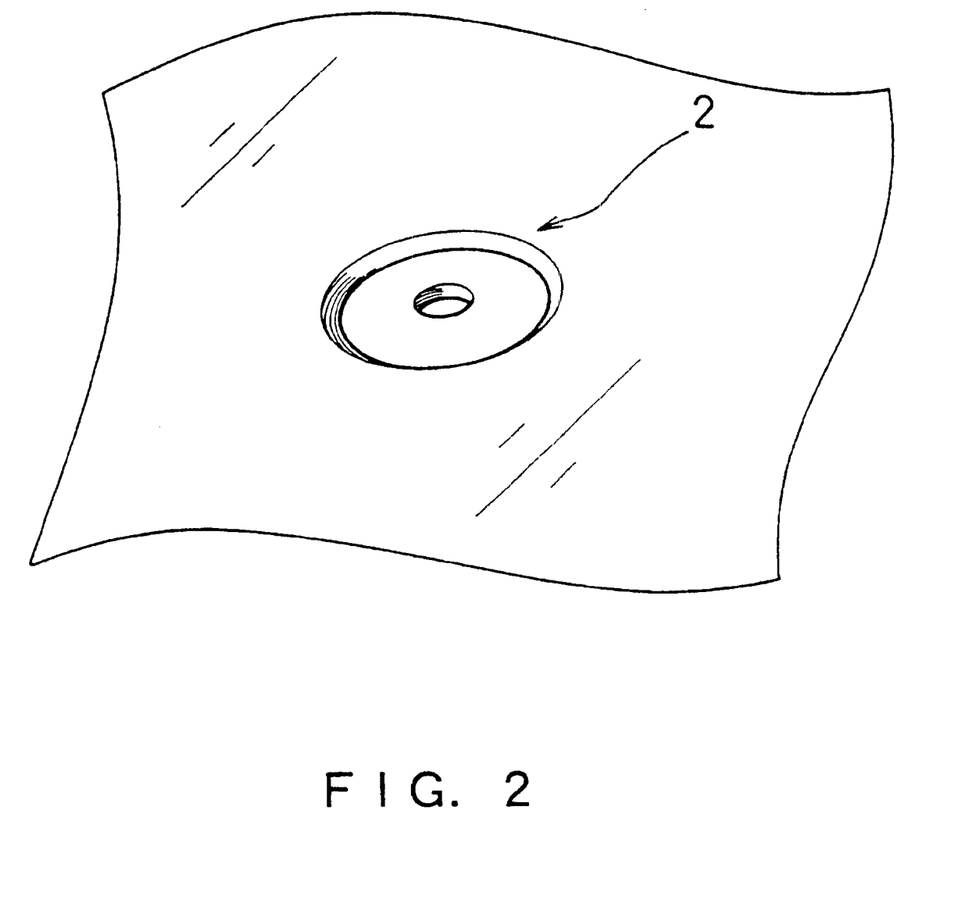
FIG. 2 is a partial perspective view of a glass sheet of the present invention, showing the vicinity of a hole.

FIG. 1 is a partial cross-sectional view showing an embodiment of a glass sheet of the present invention. As shown in FIG. 1, the glass sheet 1 includes a hole 2 for attachment of the glass sheet 1 to a support structure, for example the frame of an automobile. The hole 2 includes a central through hole 4 penetrating the glass sheet and a recess 3 having a diameter larger than that of the through hole 4 and a depth shorter than the thickness of the glass sheet 1. As shown in FIG. 2, which is a perspective view of the glass sheet 1 in the vicinity of the hole 2, the recess 3 and the through hole 4 are concentric circles. The glass sheet 1 has a step in the hole, so that the glass sheet 1 is partially thin so as to form a thin part 9.

Figure 3:
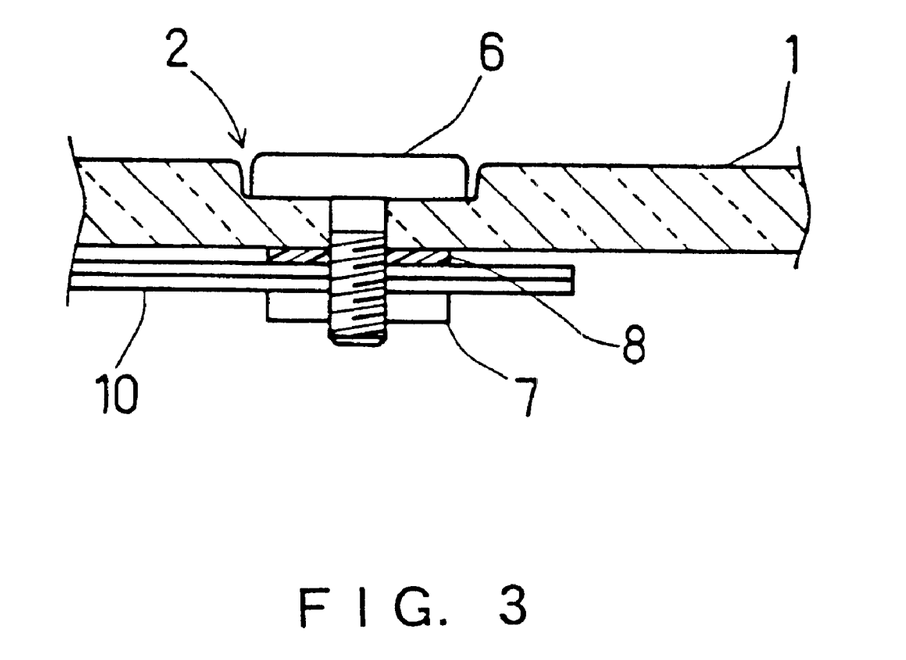
FIG. 3 is a partial cross-sectional view of an embodiment of a glass sheet of the present invention.

FIG. 3 is a partial cross-sectional view of an embodiment of a glass window for a vehicle constituted by the glass sheet 1 shown in FIG. 1. As shown in FIG. 3, a bolt 6 is inserted into the through hole of the hole 2. The bolt 6 and a nut 7 sandwich the glass sheet 1 and a vehicle body 10 so that the glass sheet 1 is fixed to the vehicle body 10. Furthermore, a resin cushion 8 is sandwiched between the glass sheet 1 and the vehicle body 10.

The bolt 6 is provided with a head having a diameter slightly smaller than that of the recess. The head of the bolt 6 is fitted in the recess of the glass sheet 1. Therefore, the bolt 6 does not protrude from the surface of the glass sheet 1. According to the present invention, the recess as well as the hole are formed in the glass sheet and a supporting member such as a bolt is fitted in the recess. Thus, the present invention can provide a glass window for vehicles in which the supporting member is substantially flush with the glass sheet.

Figure 4:
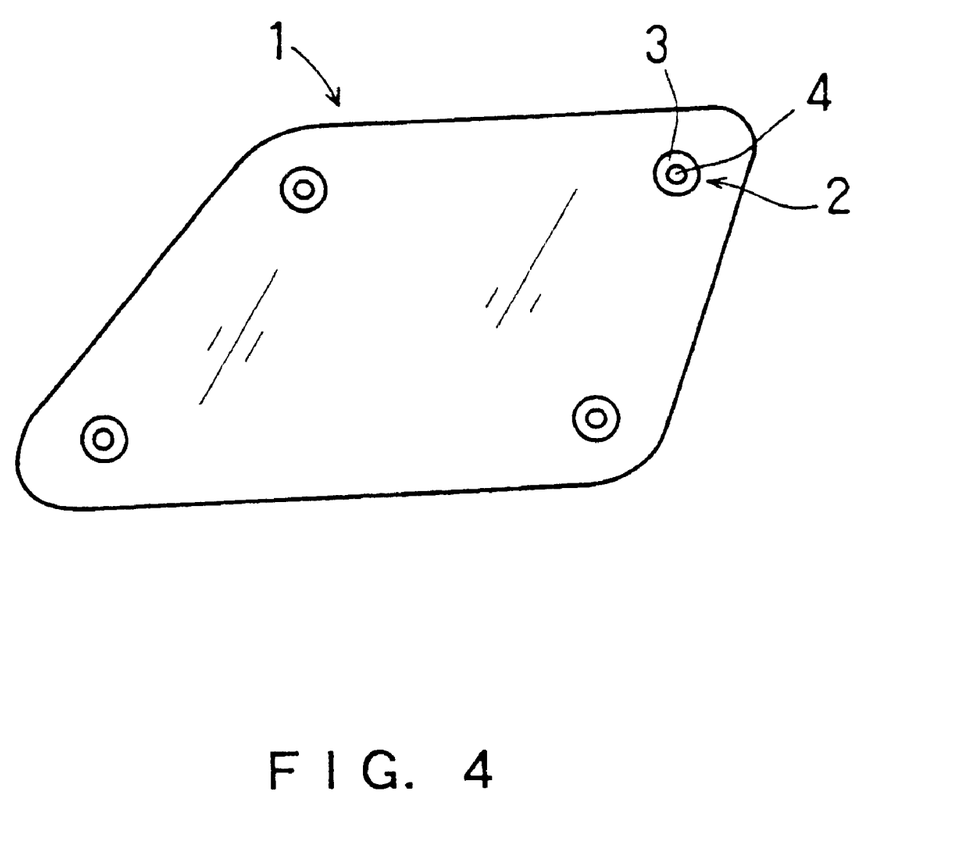
FIG. 4 is a plan view of an embodiment of a glass sheet of the present invention.

FIG. 4 is a plan view of the glass sheet of FIG. 1. As shown in FIG. 4, the hole 2 is generally formed in the peripheral region of the glass sheet 1 for fitting to a vehicle body. The number of the holes 2 can be selected suitably depending on the weight, the shape, or the attachment position of the glass sheet 1. The number of the hole 2 is generally at least two.

Figure 5:
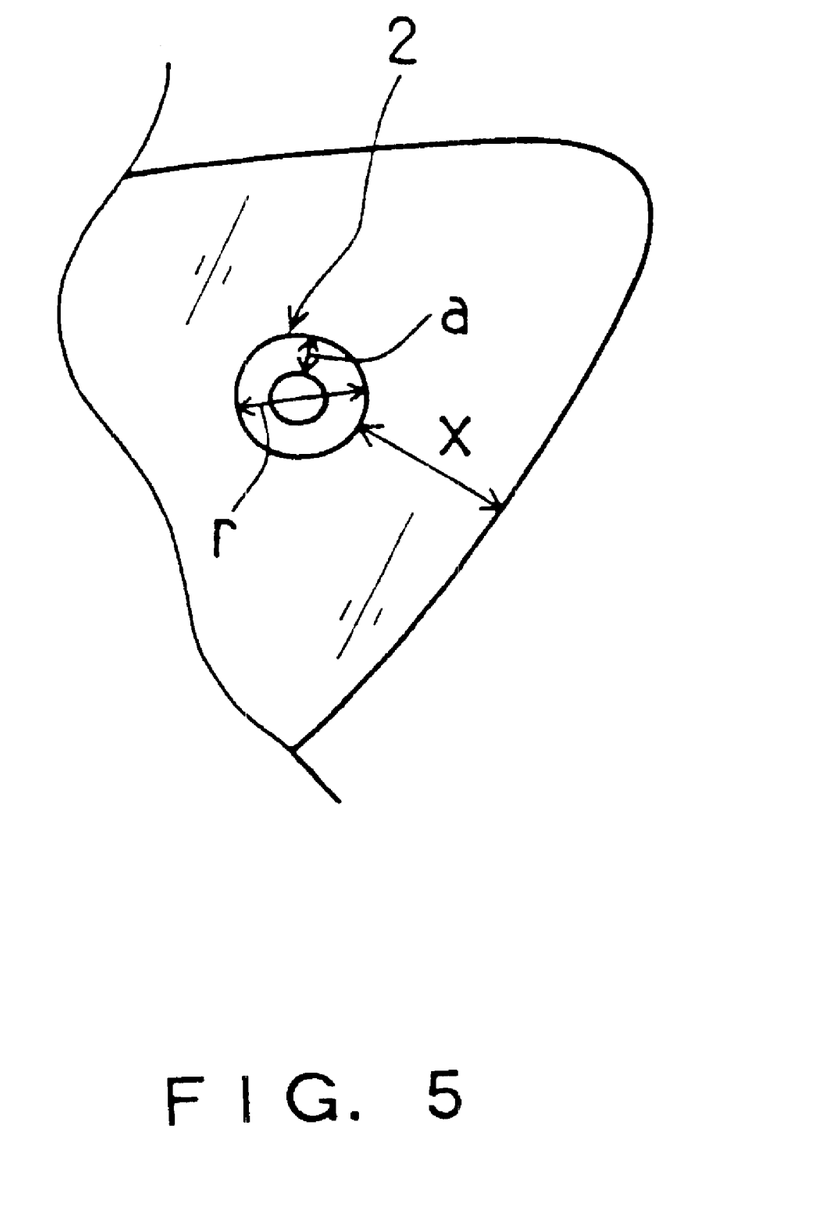
FIG. 5 is a partial plan view showing the position and the size of the hole in the glass sheet shown in FIG. 4.

When the hole is formed at a portion too close to the edge of the glass sheet, the strength of the glass sheet may be reduced. Therefore, as shown in FIG. 5, it is preferable to determine the position of the hole 2 so that the shortest distance "x" from the periphery of the hole 2 (the periphery of the recess) to the edge of the glass sheet 1 and the thickness of the glass sheet "T" satisfy the relationship x≧2T. The thickness of the glass sheet is preferably 3.5 mm to 6.0 mm, in view of the strength and the weight that are required for a vehicle window.

A width "a" of the thin part of FIG. 5 is not particularly limited, but preferably is 2 mm to 10 mm. When the width "a" is excessively small, a sufficient strength may not be obtained when the glass sheet is fixed to the vehicle.

Furthermore, although it is not particularly limited, the diameter "r" of the hole 2 (diameter of the recess) is preferably at least twice the thickness of the glass sheet T (r≧2T). To be specific, the diameter of the hole 2 is preferably about 7mm to 50 mm.

Figure 6:
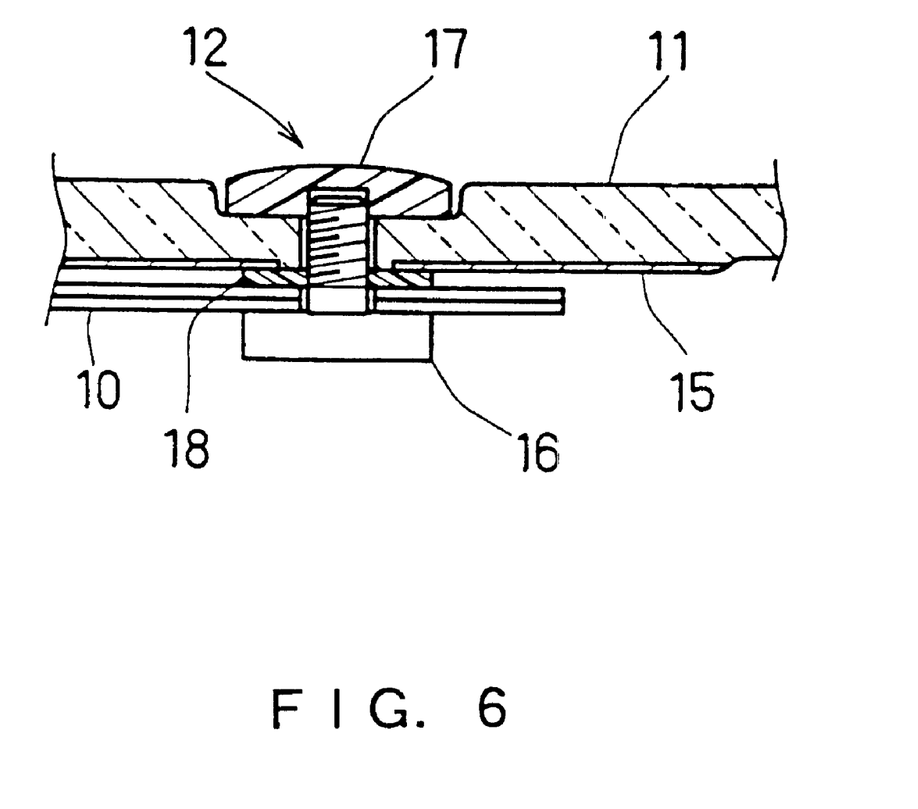
FIG. 6 is a partial cross-sectional view of another embodiment of a glass window for vehicles of the present invention.

FIG. 6 is a partial cross-sectional view of another embodiment of a glass window for vehicles in which a glass sheet is fixed to a vehicle body by utilizing a hole. In the glass window for vehicles shown in FIG. 6, a glass sheet 11 is fixed to a vehicle body 10 by a bolt 16 inserted into a hole 12 from the inside of the vehicle and a cap nut 17 fitted in the recess from the outside of the vehicle. Furthermore, as in the embodiment of a window shown in FIG. 3, a resin cushion 18 is sandwiched between the glass sheet 11 and the vehicle body 10. In the glass sheet of the present invention, a supporting member such as a bolt may be inserted into a hole from the inside of the vehicle instead of the outside of the vehicle. In this case, as in the embodiment shown in FIG. 3, a glass window for vehicles in which the cap nut 17, which is a supporting member, is substantially flush with the glass sheet 11 can be achieved.

A ceramic mask 15 may be formed in this glass window for vehicles. As shown in FIG. 6, it is preferable to form the ceramic mask 15 on the surface inside the vehicle (the surface in which the recess is not formed) of the glass sheet 11 so that the end of the ceramic mask 15 is positioned on the thin part of the glass sheet 11. When the ceramic mask 15 is formed in such a manner, the inside of the vehicle cannot be seen from the outside when the cap nut 17 is fitted in the recess. Furthermore, it is preferable to form the ceramic mask 15 so that the end thereof is not in contact with the hole 12 (the through hole). This manner prevents a paste that is a material of the ceramic mask 15 from leaking onto the other surface of the glass sheet 11 through the hole 12, when the paste is printed on the surface of the glass sheet 11.

Figure 7:
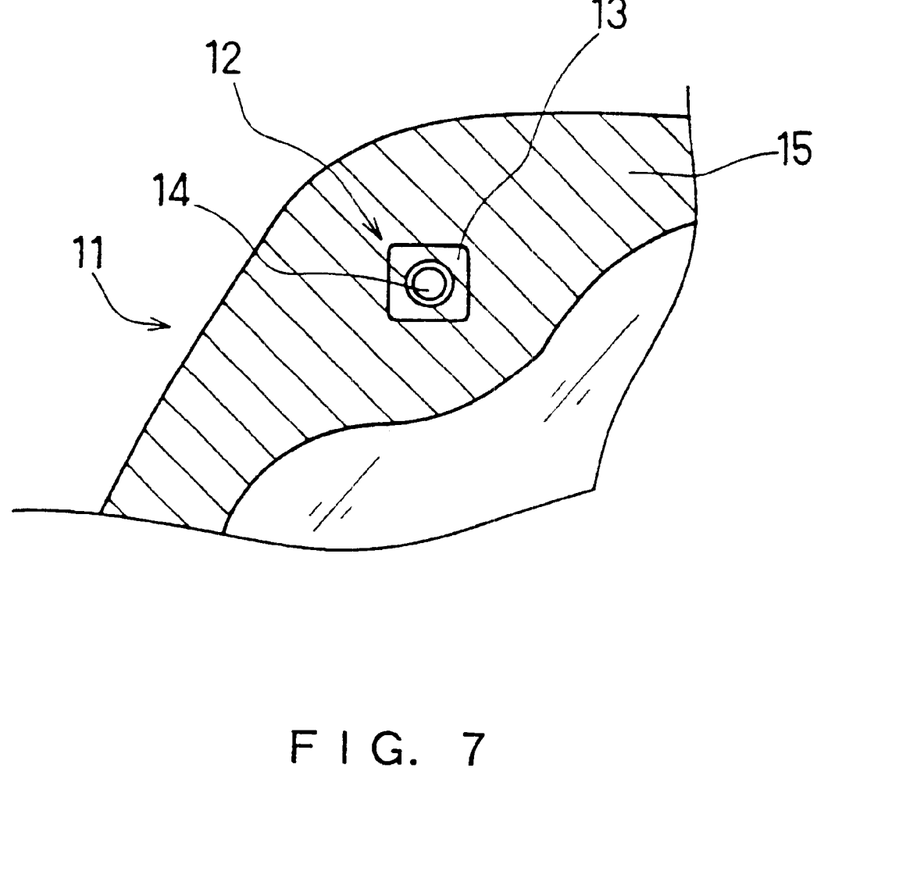
FIG. 7 is a partial plan view of the glass sheet shown in FIG. 6.

In the hole provided in the glass sheet, the recess and the through hole are not necessarily concentric. FIG. 7 shows a plan view of another embodiment of the hole. As shown in FIG. 7, the contour of a recess 13 in a hole 12 provided in the glass sheet 11 is substantially that of a square whose corners are rounded. On the other hand, a through hole 14 is formed so that the section thereof is a circle as in the through hole 4.

In the glass window for vehicles with a conventional bolt as shown in FIG. 12 the bolt 56 can be removed outside the vehicle easily. Therefore, it is difficult to prevent theft of valuable things in the vehicle by removing the glass sheet 51. However, when the glass sheet 11 is provided with the hole 12 including the recess 13 whose contour is not round, as shown in FIG. 7, a glass window for vehicles useful in preventing theft can be achieved.

More specifically, when the glass sheet 11 is fixed by fitting a supporting member in the recess 13 of the glass sheet shown in FIG. 7, is preferable to use a supporting member having a shape that can be fitted in the recess but cannot rotate in the recess. The supporting member having such a shape makes it possible to obtain a glass window for vehicles that prevents the glass sheet from being removed from outside the vehicle. For example, when a cap nut 17 as shown in FIG. 6 is used, it is desirable that the contour of the cap nut 17 is similar to the shape of the recess 13 and has a slightly smaller size than the substantially square recess 13. In this case, it is preferable to fix the supporting member fitted in the recess by a bolt or the like that is inserted in the hole from the inside of the vehicle. The use of the glass sheet provided with a hole whose contour (the contour of the recess) is not an exact circle can achieve a glass window for vehicles useful in preventing theft.

The hole of the glass sheet can be formed by various methods that have been conventionally used, such as utilizing a drill such as a diamond core drill or a super alloy drill, water jet, or supersonic processing. The recess can be formed by a drill as described above.

Figure 8:
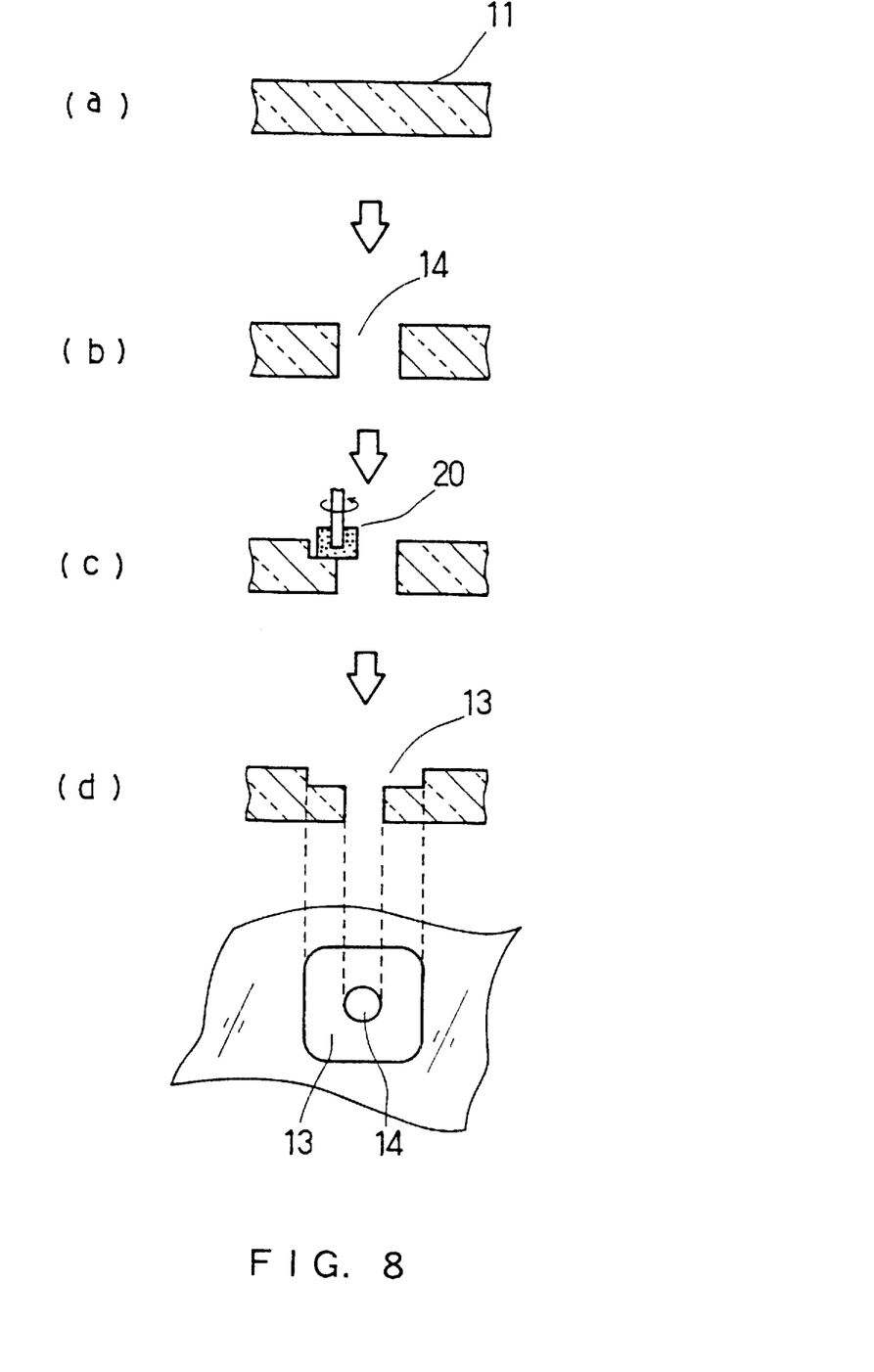
FIGS. 8A to 8D are process sequence views showing an example of a method of processing a glass sheet of the present invention.

The hole 12 whose contour is not a circle as shown in FIG. 7 can be formed, for example, by a method shown in FIG. 8. According to this method, a through hole 14 having a predetermined diameter is formed in a glass sheet 11 with a grinding wheel (FIGS. 8a and 8a). Then, the grinding wheel 20 grinds the section of the glass sheet 11 in contact with the through hole 14 to a predetermined depth so that a recess 13 is formed around the through hole 14 (FIG. 8c). The recess 13 is formed so that the shape of the recess 13 is not a circle (FIG. 8d).

Figure 9:
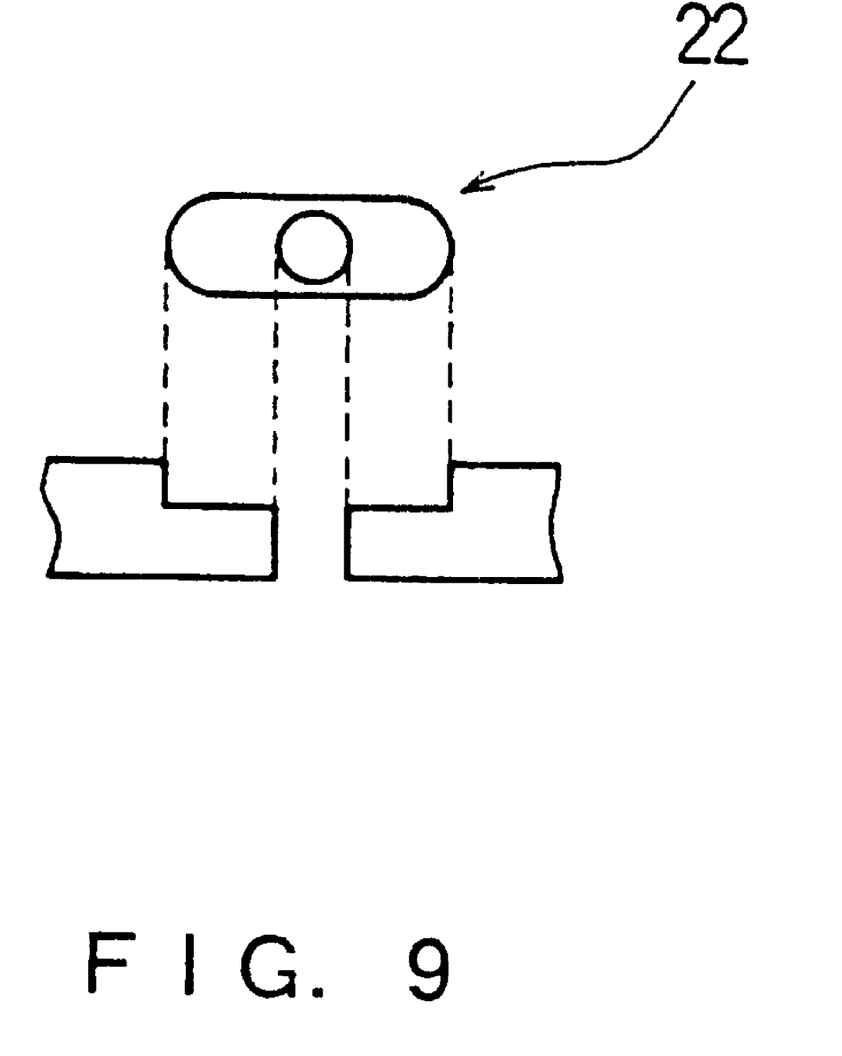
FIG. 9 is a partial plan view and partial cross-sectional view showing another embodiment of a hole formed in a glass sheet of the present invention.

The shape of the hole in the glass sheet is not limited to any particular shapes, but can be any shapes, as long as it can achieve the object of the present invention. In the glass sheet useful in preventing theft, the contour of the recess can be any shape such as ovals, various kinds of rectangles, and various kinds of other polygons, as long as it makes it possible to hold the supporting member fitted in the hole without allowing the supporting member to rotate. For example, as shown in FIG. 9, the contour of the recess may be a rectangle having a pair of opposing sides that are curved. The hole 22 as shown in FIG. 9 is also preferable in that it can be formed efficiently.

Furthermore, the shape of the section of the through hole 4 is preferably a circle. However, it may be any shape, as long as it does not hinder the fixation of the supporting member.

Conventional members can be used as the members used in the above-described illustrative glass window for vehicles without particular limitations. For example, a ceramic mask can be formed of a paste comprising a pigment that has been used in the glass sheet. The supporting member is not limited to a bolt with a nut, but any member can be used, as long as it has a suitable shape and strength for fixing a glass sheet. A soda-lime glass sheet, which is colored, if necessary, is generally used as the glass sheet. The glass sheet is tempered and/or curved, if necessary.

Figure 10:
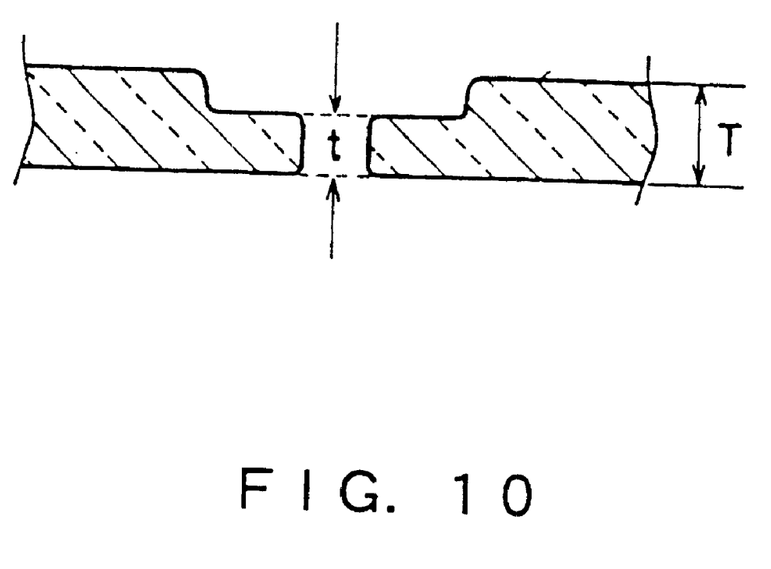
FIG. 10 is a partial cross-sectional view showing the thickness "t" of the thin part and "T" of the glass sheet in an embodiment of a glass sheet of the present invention.

Then, a preferable shape of the glass sheet will be described with reference to FIG. 10. When the thickness "t" of the thin part of the glass sheet is extremely small, the strength at the hole is reduced. On the other hand, when the difference between the thickness "t" of the thin part and the thickness "r" of the glass sheet is too small, a flush surface cannot be achieved. Furthermore, when the thickness "T" is too small, the strength thereof is not sufficient. When the thickness "T" is too large, the weight of the vehicle increases without any advantages. From this viewpoint, the thickness T of the glass sheet, the thickness t of the thin part, and the difference "τ" between the thickness "T" and the thickness "t" (grinding thickness) preferably satisfy the following relationships:

$$3.5 \text{ mm} \leq T \leq 6.0 \text{ mm} \tag{1}$$

$$t/T > \frac{1}{2} \tag{2}$$

$$\tau \geq 0.5 \text{ mm} \tag{3}$$

When the glass sheet is tempered for use, it is desirable to consider the above relationships of thickness. The tempered glass sheet has a compressive stress layer in the surface and a tensile stress layer in the inside. Therefore, when a hole is to be formed in the glass sheet, it is preferable to consider an effect that a local change of the thickness of the glass sheet can make on the stress layers.

Hereinafter, the results of the investigation of the relationship between the process shape and the strength of the tempered glass sheet will be described from this viewpoint. The thin part was formed in the edge of the glass sheet in order to measure the strength by a bending test.

Figure 11:
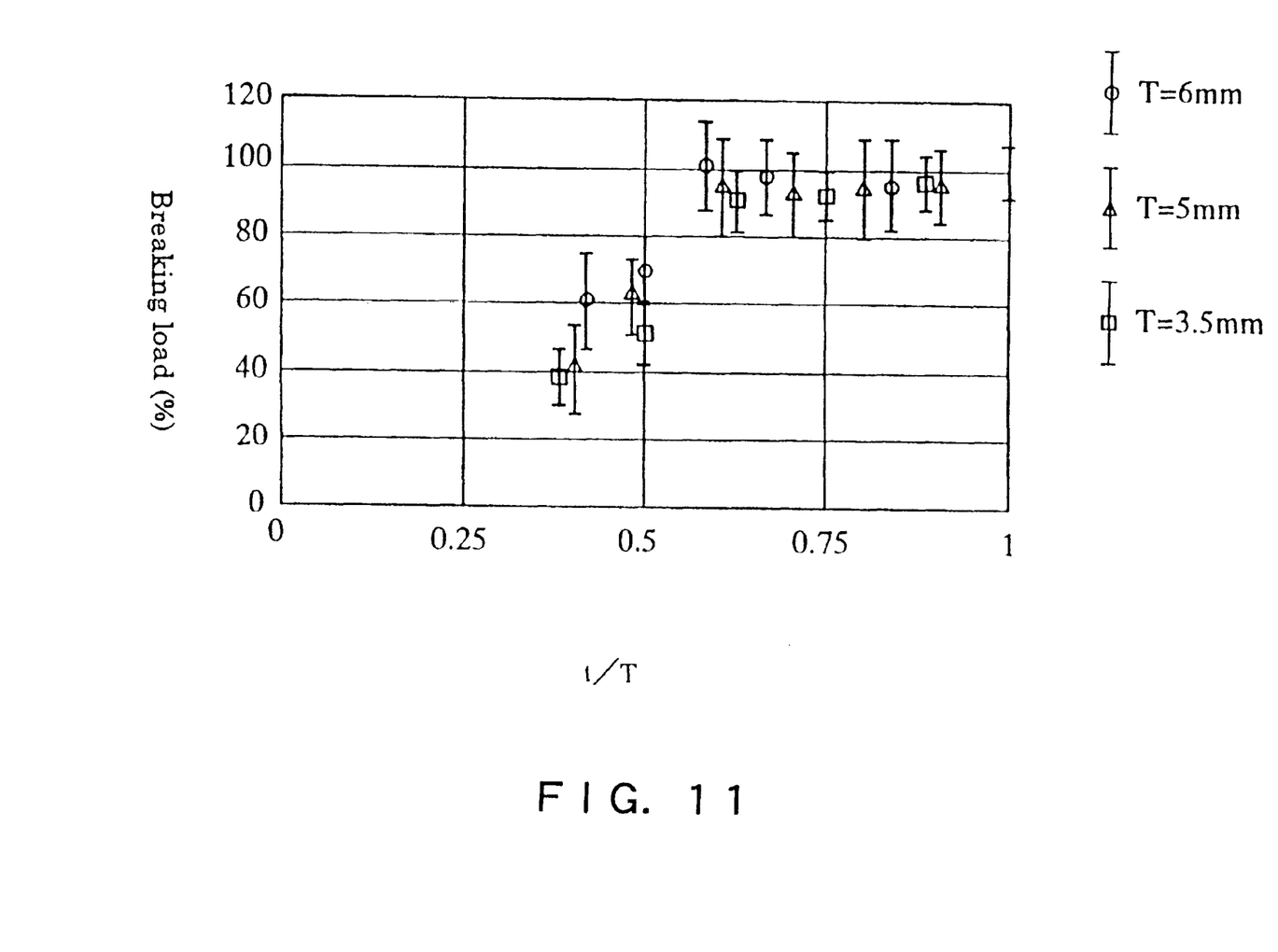
FIG. 11 is a graph showing the relationship between the thickness ratio "t/T" and the strength of the glass sheet of the present invention.

For a bending test, the edges of the tempered glass sheets were ground so that the thickness ratio "t/T" had different values. Transparent green soda-lime glass sheets were used as the glass sheets. The thickness of the glass sheet was 3.5 mm, 5mm or 6 mm. The thinned edge of the glass sheet was subjected to a bending test, and the relationship between the thickness ratio "t/T" and the bending strength of the glass sheet was examined. FIG. 11 shows the ratio of the breaking load of each glass sheet to the breaking load of the glass sheet when the edge thereof is not ground (thickness ratio t/T=1).

FIG. 11 indicates that the bending strength of the glass sheet was significantly reduced in the range $t/T \leq \frac{1}{2}$ in any thickness. On the other hand, in the range $t/T > \frac{1}{2}$, the bending strength was substantially as large as that of the tempered glass sheet whose edge was not processed, even if the edge was thinned (more specifically, 80% or more of the average strength of the glass sheets having t/T=1 was obtained).

When the tempered glass sheet is broken, the broken pieces are small and not sharp. This broken form is an important property of the tempered glass sheet in view of the security of people in an accident. A breaking test was performed with respect to each glass sheet produced in the same manner as described above. The breaking test was performed according to Japanese Industrial Standards (JIS) R 3212. Table 1 shows the results.

The evaluation criteria in Table 1 were as follows:
Inplane (in a principal surface where a step is not formed):
A circle (○) indicates that the glass sheet satisfies the criteria defined in JIS R 3212.
A cross (×) indicates that the glass sheet does not satisfy the criteria defined in JIS R 3212.
Step portion:
A circle (○) indicates that there is no long fragment having a long side length of 30 mm or more.
A triangle (Δ) indicates that there are less than ten long fragments having a long side length of 30 mm or more.
A cross (×) indicates that there are at least ten long fragments having a long side length of 30 mm or more.

TABLE 1

|  | 3.5 mm | | 5 mm | | 6 mm | |
| --- | --- | --- | --- | --- | --- | --- |
| t/T | Inplane | Step portion | Inplane | Step portion | Inplane | Step portion |
| 0.4 | ○ | × | ○ | × | ○ | × |
| 0.5 | ○ | Δ | ○ | Δ | ○ | × |
| 0.6 | ○ | ○ | ○ | ○ | ○ | ○ |
| 0.7 | ○ | ○ | ○ | ○ | ○ | ○ |
| 0.8 | ○ | ○ | ○ | ○ | ○ | ○ |
| 0.9 | — | — | ○ | ○ | ○ | ○ |
| 1.0 | ○ | — | ○ | — | ○ | — |

As shown in Table 1, in the range $t/T \geq \frac{1}{2}$, the fragments broken apart from the step portions were large. On the other hand, in the range $t/T > \frac{1}{2}$, the fragments broken apart from the step portions were sufficiently small. Thus, by making the thickness of the glass sheet satisfy the relationship $t/T > 1/2$, a tempered glass sheet whose fragments are less dangerous to people when it is broken can be obtained.

The above-described results confirmed that it was especially preferable to satisfy the relationship expressed by inequality (2) in the tempered glass sheet.

Industrial Applicability of the Invention

As described above, according to the present invention, a hole for attachment of the vehicle body is formed in the glass sheet so that a thin part having a thickness smaller than that of the glass sheet is formed at a portion in contact with the glass sheet. Thus, the present invention provides a glass sheet suitable for a window for vehicles having a flush surface. Furthermore, the glass sheet is fixed to the vehicle body by fitting a supporting member in the hole, so that a window for vehicles having a flush surface can be provided.

What is claimed is:

1. A vehicle window comprising a tempered glass sheet and a supporting member, wherein the tempered glass sheet comprises a hole formed in the tempered glass sheet that includes a through hole and a stepped portion in contact with the through hole, and the stepped portion includes a thin part where a thickness of the glass sheet is reduced, and the thickness of the tempered glass sheet is between 3.5 mm and 6.0 mm, and a difference in thickness between the glass sheet and the thin part is 0.5 mm or more, and the thickness of the thin part is larger than half of the thickness of the glass sheet, and the supporting member is fitted in the hole for attachment of the glass sheet to a body of a vehicle.

2. The vehicle window according to claim 1, wherein the tempered glass sheet is fixed to the vehicle body by the supporting member.

3. The vehicle window according to claim 1, wherein the hole is surrounded with a ceramic mask on the tempered glass sheet.

4. The vehicle window according to claim 3, wherein the ceramic mask is formed so that the end of the ceramic mask is positioned on the thin part of the tempered glass sheet.

5. The vehicle window according to claim 1, wherein a resin cushion is located between the tempered glass sheet and the body of a vehicle.

6. The vehicle window according to claim 1, wherein the shortest distance between a periphery of the hole and an edge of the glass sheet is at least twice the thickness of the glass sheet.

7. The vehicle window according to claim 1, wherein the outer periphery of the hole is not circular.

8. The vehicle window according to claim 1, wherein the thin part surrounds the through hole.

9. The vehicle window according to claim 1, wherein the thickness of the tempered glass sheet is between 3.5 mm and 5 mm.

* * * * *